United States Patent
Spain

[11] 3,883,328
[45] May 13, 1975

[54] CARBON FIBER ELECTRODES FOR ELECTRICAL PRECIPITATORS

[76] Inventor: Raymond G. Spain, 4805 Metcalf Dr., Raleigh, N.C. 27612

[22] Filed: Nov. 29, 1973

[21] Appl. No.: 420,275

[52] U.S. Cl.................. 55/154; 21/74 R; 55/131; 55/527
[51] Int. Cl. ............................................. B03c 3/40
[58] Field of Search............ 55/527, 131, 154–157, 55/DIG. 16; 21/74 R

[56] References Cited
UNITED STATES PATENTS

| | | | |
|---|---|---|---|
| 2,579,441 | 12/1951 | Palmer | 55/131 |
| 3,577,705 | 5/1971 | Sharlit | 55/131 |
| 3,765,154 | 10/1973 | Hardt et al. | 55/155 |

*Primary Examiner*—Bernard Nozick
*Attorney, Agent, or Firm*—Fraser and Bogucki

[57] ABSTRACT

A collecting electrode comprised of a batt of carbon fibers is used to remove sub-micron size dispersoids from gases treated in an electrical precipitator. One form of the carbon fiber electrode provides for the thermo-oxidative removal of some types of organic dispersoids from the electrode.

3 Claims, 3 Drawing Figures

3,883,328
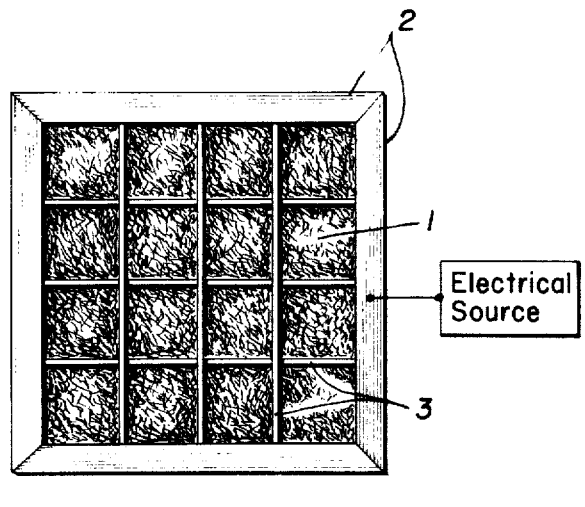
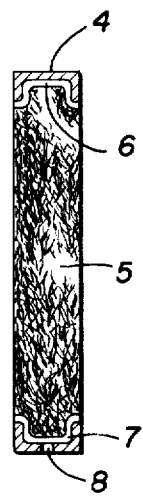
FIG. 1.
FIG. 2.
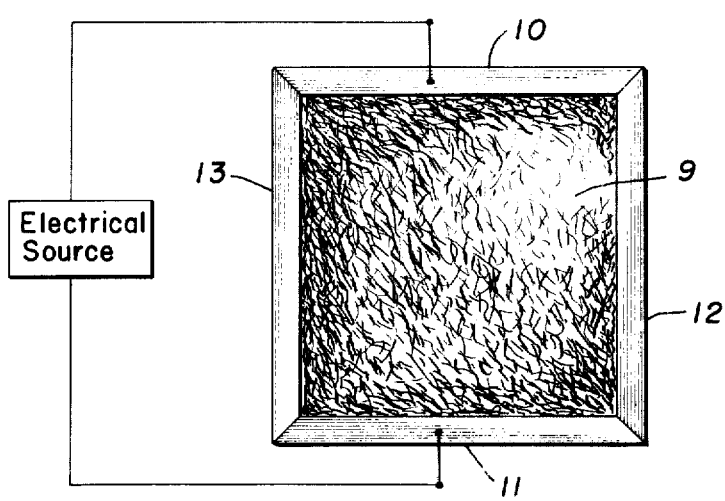
FIG. 3.

CARBON FIBER ELECTRODES FOR ELECTRICAL PRECIPITATORS

FIELD OF THE INVENTION

The present invention relates to a carbon fiber electrode for the collection of sub-micron size particles from gas streams by electrical precipitation.

BACKGROUND OF THE INVENTION

Collecting electrodes of current electrical precipitators typically consist of plates; pipes; screens; and rows of rods, chains and wires. Generally, dispersoid containing gases are passed parallel to these various electrodes.

In the single stage method of electrical precipitation, a corona discharge is maintained directly between the discharge electrode and the collecting electrode. This method has the advantage of maintaining a corona precipitation field which prevents redispersion of precipitated materials. This is of obvious importance for treating industrial gases which contain high concentration of dispersoids and where high gas velocities are required. It has the disadvantage that the space charge may also produce nitrogen oxides and ozone in gases containing air. Both nitrogen oxides and ozone are highly objectionable air pollutants. Typical D.C. voltages for single stage precipitators are 50,000 to 75,000 volts.

The two stage precipitator typically uses much lower corona generating voltages, such as a range of 12,000 to 14,000 volts, and very greatly reduces the undesirable generation of undesirable materials, such as nitrogen oxides and ozone. Dispersoids are precipitated in a second zone or stage, which typically operates at even lower voltages in the range of 5,000 to 7,000 volts. As the collecting electrodes of the two stage type precipitators are much more closely spaced than in the one stage type precipitators, the two stage apparatus finds greater use in removing low concentrations of dispersoids so that the frequency of cleaning does not become excessive. For example, it may be used to remove dispersoids from air where a high degree of cleanliness is desired.

In theory, electrical precipitators can very closely approach 100 percent removal of dispersoids from gases. In practice, particularly where the dispersoids are not desired products, the percentage of removal is typically in the range of 85 to 95 percent. Largely, these lower effeciencies are the result of the excessive size and cost of conventional electrical precipitators of greater efficiencies.

In general, very small size dispersoids are more difficult to remove from gases than are larger dispersoids. Some small size dispersoids are illustrated in the table below:

| Dispersoid | Particle Diameter, Microns |
|---|---|
| Silica dust | 5 |
| Alkali fume | 1 to 5 |
| Ammonium chloride fume | 0.1 to 1 |
| Tobacco smoke | 0.25 |
| Zinc oxide fume | 0.05 |
| Viruses | 0.2 to 0.25 |

Further, the efficiency of electrical precipitation is adversely affected when the dispersoids are initially present in gases at very low concentrations.

The deposition of even small amounts of poorly conducting materials on the collecting electrodes can significantly lower the arcing voltage between electrodes, also reducing the efficiency of operation.

It is therefore an object of the present invention to provide collecting electrodes comprised of selected types of carbon fibers for electrical precipitators which can more effectively remove small size dispersoids present in low quantities in gases. In particular, the electrodes of the present invention are useful in removing materials which are toxic to human life and/or harmful to the environment at low levels in the atmosphere.

BRIEF STATEMENT OF THE INVENTION

In accordance with the present invention, a collecting electrode for electrical precipitators is comprised of a planar mass of selected types of carbon fibers in woven and preferably in mat or felt form.

The individual carbon fibers comprising the collecting electrode have the following preferred characteristics:

| | |
|---|---|
| Electrical Resistivity, $10^{-4}$ ohm —cm | 2 to 15 |
| Carbon content, % | above 98 |
| Equivalent circular diameter, microns | 6 to 12 |
| Surface area, square meters per gram | 0.4 to 1.5 |
| Axial fiber moduli, $10^6$ psi | above 10 |
| Density, grams per cubic centimeter | above 1.7 |

The flexible sheet of carbon fibers may be used as plate type electrodes, or it may be formed as pipe type electrodes or other shapes of simple curvature. The fibrous mass may be confined in a frame, as are air filters, to maintain the desired shape and to facilitate handling.

Apparent density of the carbon fiber mass may be in the range of about 0.02 to 0.10 grams per cubic centimeter.

The flexible sheet of carbon fibers may be rigidized by wetting the fibrous sheet formed to the desired electrode shape with a solution of a high carbon char yielding resin, such as a phenolic resin. On draining, the resin solution will form nodules at points of fiber contact. Heating the fibrous mass to about 220° C removes residual solvent and cures the resin. Further heating to a temperature of 1,000° C or higher in an inert atmosphere converts the resin nodules to a carbonaceous residue. The resultant carbonaceous nodules effect a rigidization of the fibrous mass and a substantial increase in the electrical conductivity of the fibrous mass as the carbon nodules act as conductive bridges between adjacent carbon fibers. Rigidization may be accomplished by applying sufficient resin in solution form to yield a carbon char residue of about 2 to 10 weight per cent of the carbon fibers.

The carbon fiber collecting electrodes have much greater surface area than do conventional collecting electrodes, and may exceed the collection surface area by two or more orders of magnitude. Thus carbon fiber collecting electrodes can arrest far greater quantities of dispersoids with a much smaller build up of dispersoid coating.

Carbon fibers are much more resistant to corrosion than metals commonly employed as collecting electrodes. This is an important consideration in the operation of electrical precipitators treating corrosive dispersoid containing gases, and it also allows the chemical removal of collected dispersoids by chemical agents which are highly corrosive to common metals, but to which carbon fibers are inert. For example, carbon fibers are inert to hydrochloric and sulfuric acids.

Gas flow may be directed parallel to the carbon fiber mass forming the electrode, but the preferred flow is through the carbon fiber mass so as to better utilize the high collecting surface area of the carbon fibers.

Carbon fiber collecting electrodes also provide a method to destroy some collected materials which may be harmful to human life, such as bacteria and viruses. As the resistivity of the carbon fiber masses allows them to function as resistance heating elements, the high electrostatic potential applied to these electrodes may be briefly interrupted and a lower voltage potential applied across the individual electrodes causing them to be heated. Brief heating of the carbon fiber electrodes in air to temperatures of up to 800° F are sufficient to destroy the activity of bacteria and viruses. By continuing the heating for periods of up to two minutes, the collected bacteria and viruses are substantially oxidized to gases, freeing the electrodes of the previously collected matter.

DESCRIPTION OF THE DRAWINGS

The features of the present invention are pointed out with particularity in the appended claims. The invention itself together with further objects and advantages thereof, may be best understood with reference to the following description taken in connection with the drawings in which:

FIG. 1 is a plan view of a collecting electrode in accordance with the one embodiment of the present invention;

FIG. 2 is a cross-sectional view of the electrode of FIG. 1; and

FIG. 3 is a plan view of a collecting electrode in accordance with another embodiment of the present invention.

DESCRIPTION OF PREFERRED EMBODIMENTS

FIG. 1 illustrates a carbon fiber collecting electrode which includes the carbon fiber mass 1 in woven, felt or mat form, a corrosion resistant and electrically conducting outer frame 2 and a corrosion resistant surface supporting grid 3 to hold the carbon fiber mass in place.

The term "corrosion resistant" is to denote materials that are not significantly degraded by immersion in strong bases, such as aqueous sodium hydroxide, or strong mineral acids, such as aqueous hydrochloric or sulfuric acids.

Electrodes employing a rigidized mass of carbon fibers require a lesser surface support than carbon fiber masses which are not rigidized, and may require no surface support at all.

FIG. 2 illustrates the carbon fiber collecting electrode which includes the corrosion resistant and electrically conducting outer frame 4, the carbon fiber mass 5, and the interface of the outer frame and carbon fiber mass 6. The electrical conductivity at the interface 6 may be enhanced by applying a high carbon char yielding resin in liquid form to the interface during assembly of the electrode, followed by heat curing of the resin and subsequent pyrolysis in an inert environment to yield an electrically conductive carbon char residue. A channel in the lower frame member 7, and drainage holes 8 permit the removal of liquids to chemically solubilize and remove collected material from the electrode.

The chemical solubilization and removal of collected material from the electrode may be done externally to the electrical precipitator by removal of the electrode, or by an in place technique performed intermittently during an interruption of the electrical potential to the electrode and the dispersoid containing gas flow.

FIG. 3 illustrates the carbon fiber electrode consisting of the carbon fiber mass 9, electrically conducting outer frame members 10 and 11, and electrically insulating frame members 12 and 13. Members of the electrode surface supporting grid (not shown) must also be electrically insulating. During a predetermined interruption of the high electrical potential to the electrode and an interruption of high dispersoid containing gas flow rates, an alternating or direct voltage potential is applied across the carbon fiber mass from the frame members 10 and 11 of a magnitude sufficient to resistively heat the carbon fiber mass up to temperatures of up to 800° F. After removal of certain organic types of materials from the electrode by thermo-oxidation, the normal operating conditions of the collecting electrode are restored.

The collecting electrodes shown in FIGS. 1, 2 and 3 are capable of removing particulate materials of a wide range of sizes from gases. The electrodes are particularly suited to the removal of submicron particles even at low concentrations in gases.

Although the description has been limited to particular embodiments of the present invention, it is thought that modifications and variations would be obvious to one skilled in the art in light of the above teachings. It is understood, therefore, that changes may be made in the features of the present invention described herein which fall within the full intended scope of the invention as defined by the following claims.

What I claim is:

1. A collecting electrode to remove particulate materials from gases by electrical precipitation comprising:
   a mass of carbon fibers with an apparent density of 0.02 to 0.10 grams per cubic centimeter, with average individual fibers having an electrical resistivity of 2 to 13 × $10^{-4}$ ohm-centimeters, an axial fiber moduli greater than 10 × $10^6$ psi, a density greater than 1.7 grams per cubic centimeter, and an equivalent diameter of 6 to 12 microns; and
   a corrosion resistant frame surrounding the mass and a means of applying a positive or negative direct current charge of at least 5000 volts to the carbon fiber mass and to provide mechanical support to the carbon fiber mass.

2. The collecting electrode of claim 1 wherein the carbon fiber mass is rigidized by impregnating the carbon fiber mass with a carbon char yielding resin in liquid form in sufficient quantity to yield a carbon char on pyrolysis in the amount of 2 to 10 weight per cent of the carbon fiber mass.

3. The collecting electrode of claim 2 wherein a means of controllable electrical resistant heating of the carbon fiber mass is provided by applying an alternating or direct current potential across the electrode by electrical contacts at the opposing edges of the electrode.

* * * * *